April 3, 1945.　　　G. F. DARLING　　　2,372,813
WINDSHIELD WIPER
Filed March 18, 1942　　2 Sheets-Sheet 1
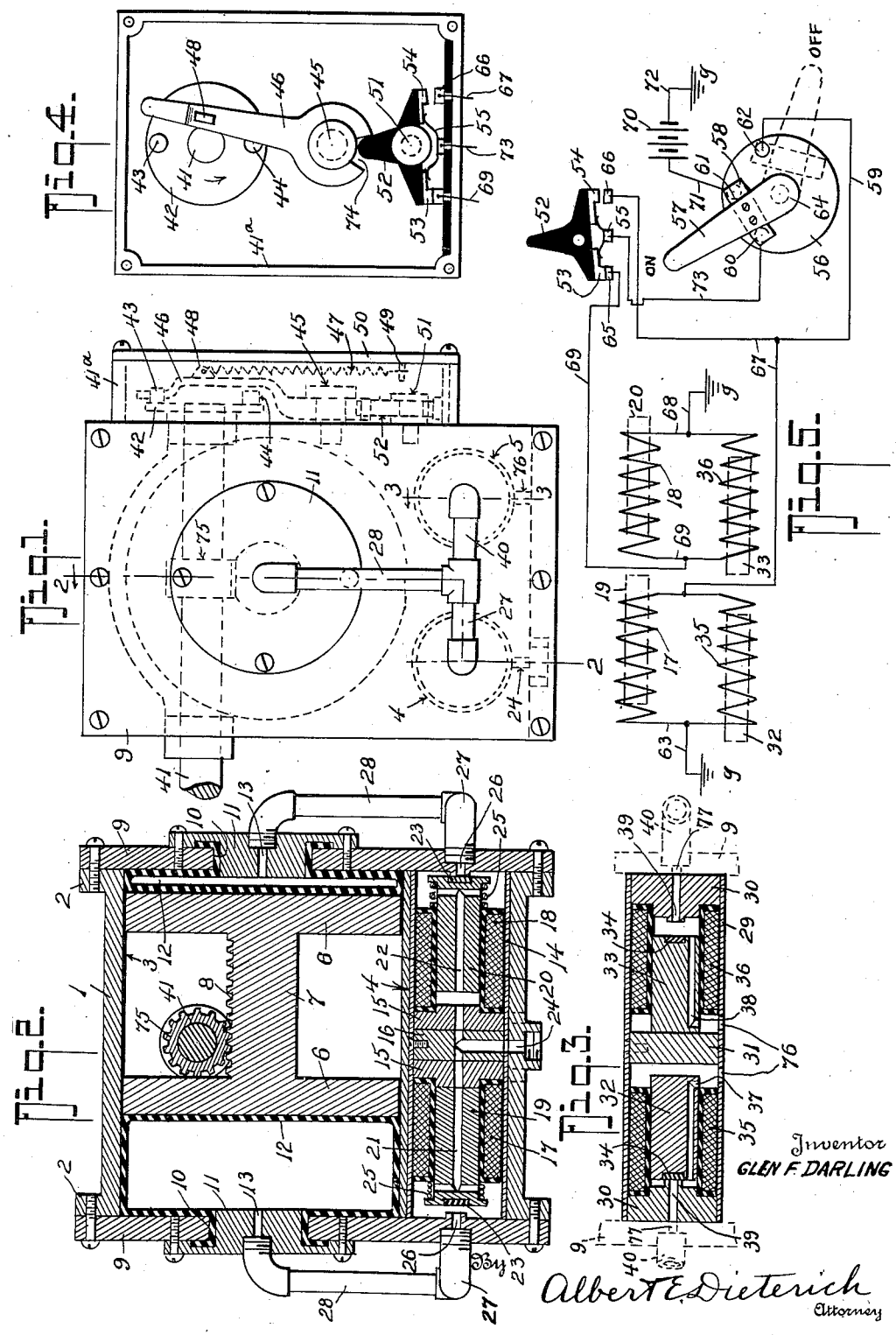
Inventor
GLEN F. DARLING
By Albert E. Dieterich
Attorney

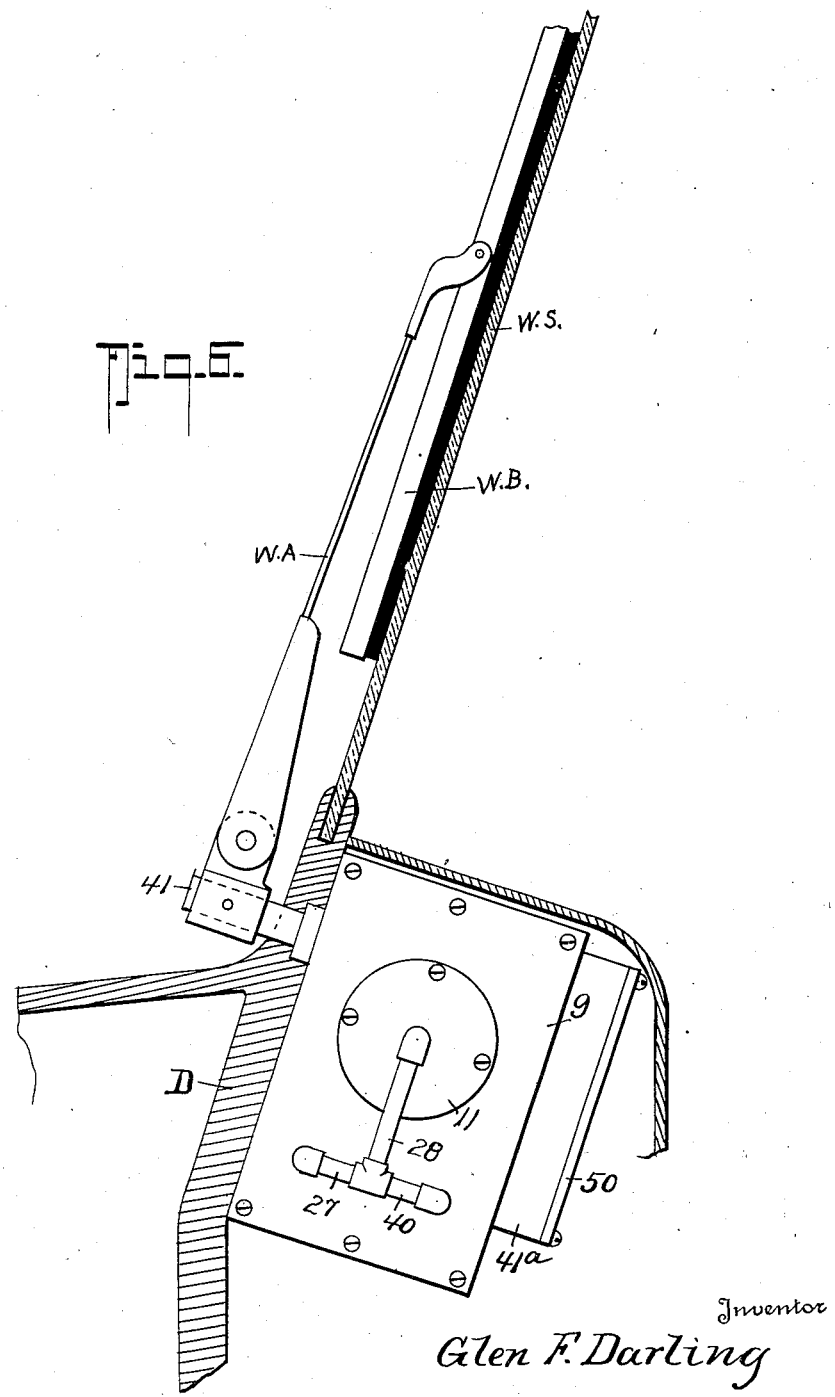

Patented Apr. 3, 1945

2,372,813

UNITED STATES PATENT OFFICE 2,372,813

WINDSHIELD WIPER

Glen F. Darling, Hollywood, Calif.

Application March 18, 1942, Serial No. 435,242

19 Claims. (Cl. 121—148)

My invention relates to a certain new and improved windshield wiper which operates under compressed air.

Primarily the invention has for an object to provide a windshield wiper motor which will operate under relatively low air pressure and one which will use a minimum amount of air, and consequently will not become much of a drain on the compressed air tank usually found on motor vehicles with air brakes—for which vehicles my invention is especially adapted.

Further, it is an object to provide a compressed-air operated windshield wiper which, when the controlling medium is cut off, will be automatically parked, i. e., returned to a predetermined, out-of-the-way position.

Further, it is an object to provide a windshield wiper motor operated by compressed air, controlled by electrically energized, mechanically controlled valve devices.

Further, it is an object to provide a compressed-air operated wiper motor having solenoidal-magnet valves, with a mechanically actuated current-switching device to control the same while in operation, and a manually operated "off"-and-"on" switch with provision for always effecting a parking of the wiper when the switch is in the "off" position.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is an end elevation of my new and improved wiper.

Fig. 2 is a section on line 2—2 of Fig. 1.

Fig. 3 is a detail section on line 3—3 of Fig. 1, showing the exhaust valve unit with the parts in the positions they assume while the parts of Fig. 2 are in the positions illustrated.

Fig. 4 is an elevation of the commutating switch box with the cover removed.

Fig. 5 is a circuit diagram.

Fig. 6 is a view illustrating my invention in use.

In the drawings, in which like numerals of reference indicate like parts in all the figures, 1 is the motor casing to whose end flanges 2 the heads 9 are secured in any suitable way (screws being shown). The casing has a piston chamber or bore 3 and two valve-receiving bores 4 and 5 for the inlet and exhaust valves respectively.

Within the chamber 3 is a free piston composed of two heads 6 connected by a rack bar 7 whose rack teeth 8 mesh with a pinion 75 fixed on the wiper shaft 41 that is journalled in suitable bearings in the case and on the outside carries the usual wiper arm (not shown).

The heads 9 are bored at 10 to receive the plugs 11 by which the inflatable bags 12 are secured to the heads. These bags 12 lie in the chamber 3 at either end of the piston 6, 7, 6, while the shaft 41 lies between the heads 6, 6 (see Fig. 2). The plugs 11 have ports 13, later again referred to.

In the preferred embodiment of the invention (that which is illustrated in the drawings) the inlet valve mechanism is assembled as a unit, and as such comprises a shell (cylinder) 14, designed tightly to fit the bore 4 so as to prevent air leakage. The shell 14 is provided with a partition 16 dividing it into two sections in each of which is a magnet base 15. A solenoidal magnet coil 17 is in one side and another solenoidal magnet coil 18 is in the other side of the shell 14. The magnet coils 17 and 18 contain solenoid cores 19 and 20 respectively and these cores each constitute an inlet valve element. These elements are provided with rubber (or its equivalent) valve discs 23 to engage fixed valve seats (for ports 26) on the heads 9, and they are also provided with fluid passages 21, 22 respectively. The combined valve-cores 19 and 20 are continuously urged toward the seats 26 by springs 25.

Compressed air is led to the valve-cores through passages in the elements 16, 15, 15, from a main air intake 24 to which a suitable connection (not shown) from a source of compressed air supply is connected. The respective ports 26 communicate with the respective inflation bags through ducts 27, 28.

In Fig. 3 I have shown the exhaust valve unit. It comprises a shell 29 having a partition 31 and magnet bases 30 at its ends, the latter having ports 39, with valve seats.

Magnet coils 35 and 36 are located in the shell 29 and cooperate with combined exhaust-valve cores 32 and 33 respectively. The elements 32 and 33 have valve discs 34 of rubber, leather, or other suitable material, and they also have ducts 37 and 38, respectively. The shell 29 has ports 16 to atmosphere.

The heads 9 have ports 77 which communicate with the ports 39 and, by means of ducts 40, with duct 28.

A switch box 41ᵃ is formed on or secured to the casing 1, and has a removable cover 50. The shaft 41 extends into the box 41ᵃ and carries a disc 42 having two diametrically opposite pins 43—44 to engage, alternately, the toggle lever 46 that is pivoted on a stud 45 and has a notch 74 to receive the end of the toggle switch arm 52. A spring 47 has one end anchored to lug 48 on lever 46 and its other end anchored to a pin 49 which lies below stud 45 but is located in a position along the transverse central vertical plane of the box 41ᵃ in which plane the axes of studs 45 and 51 lie.

53 and 54 are contacts on member 52 with which a fixed contact 55 is electrically connected.

The parts illustrated in Fig. 4 constitute what I shall hereafter call the commutating switch.

In Fig. 5 is shown the manually operated "on" and "off" and "parking" switch. This switch comprises a base 56 carrying suitable insulated contacts 60, 61 and 62, to which a lever 57, that carries a contact bridging plate 58, is pivoted at 64.

The contact 65 of the toggle switch is connected by wire 69 to one terminal each of coils 18 and 36, the other terminals of which are grounded via wire 68.

Contact 66 of the toggle switch is connected by wire 67 to one terminal each of magnets 17 and 35, the other terminals of which are grounded via wire 63. Contact 55 of the toggle switch is connected by wire 73 to contact 60 of the manual switch; contact 62 of the manual switch is connected by wire 59 to wire 67; and contact 61 is connected by wire 71 to the battery 70 which is grounded via wire 72.

In Fig. 6 the windshield is indicated by the reference letters W. S.; the wiper arm is indicated by W. A.; the wiper blade by W. B.; and the dash of the automobile by D. As the parts just mentioned are per se no part of my invention they have been only conventionally illustrated.

*Operation*

Assume the parts to be in the position shown in Figs. 2 and 3 of the drawings, compressed air being admitted to port 24, manual switch being in the "on" position, and magnets 17 and 35 just about to be de-energized.

In Fig. 4 piston 6, 7, 6 has just completed its stroke and thrown over the toggle switch to the position shown in Figs. 4 and 5, thereby de-energizing magnets 17 and 35 and energizing magnets 18 and 36. Core 19, being released, will be moved by spring 25 and air pressure to its seat to close adjacent port 26; core 32, being now free from magnetic influence, will be forced from left to right in Fig. 3 to open adjacent port 39 to atmosphere. Magnets 18 and 36, being now energized, pull in cores 20 and 33, opening port 26 at right of Fig. 2 and closing port 39 at right of Fig. 3.

Fluid now passes into the right-hand bag 12 (Fig. 2) via 24, 22, right-hand port 26, ducts 27, 28 and right-hand port 13, while fluid is exhausted from left-hand bag 12 via left-hand port 13, ducts 28, 40, ports 39 (left hand, Fig. 3), 37 and 76 to atmosphere. Just before piston 6, 7, 6 reaches its left-hand position (Fig. 2), pin 44 will engage and move lever 46 past the dead center, whereupon spring 47 will snap it over to throw switch 52 to close 54—66 and open 53—65, thereby reversing the process and completing the cycle of operation.

The oscillation of shaft 41 continues so long as compressed air is supplied and switch 56 is in the "on" position.

As switch lever 57 is moved clockwise to turn off the current, plate 58 will bridge contacts 61, 62 for a short time and thereby current is caused to flow via 61, 62, 59, 67 to coils 17 and 35 to bring the piston to the position of Fig. 2 where it will remain parked until switch-lever 57 is again moved to the "on" position.

While I have shown a very practical embodiment of my invention in the accompanying drawings, I do not wish to limit myself to the specific embodiment shown, as numerous modifications will no doubt occur to those skilled in the art and be within the scope of the appended claims.

What I claim is:

1. In a compressed air operated motor of the class described, a cylinder, a free piston mounted in said cylinder, electro-magnetically actuated inlet and exhaust valves for the respective ends of said cylinder, means for leading air under pressure to said cylinder via said inlet valves, means for liberating air to atmosphere from said cylinder via said exhaust valves, circuit switching means for the current energizing the magnets of said valves to cause compressed air to enter and exhaust from the respective ends of the cylinder alternately, means for operating said switching means to effect continuous operation of the motor while current and compressed air are on to return the piston to a predetermined position and effecting discontinuance of said continuous operation.

2. In a compressed air operated motor of the class described, a cylinder, a free piston mounted in said cylinder, electro-magnetically actuated inlet and exhaust valves for the respective ends of said cylinder, means for leading air under pressure to said cylinder via said inlet valves, means for liberating air to atmosphere from said cylinder via said exhaust valves, circuit switching means for the current energizing the magnets of said valves to cause compressed air to enter and exhaust from the respective ends of the cylinder alternately, means for operating said switching means to effect continuous operation of the motor while current and compressed air are on, and manually controlled electrically actuated means for returning the piston to a predetermined position when the continuous operation of the current effecting the continuous operation of the motor is cut off.

3. In a motor operated by compressed air, a cylinder and a piston operating therein, a shaft operated by said piston, means to conduct compressed air alternately into the ends of the cylinder and exhaust the air from the same, said means including an electro-magnetically actuated inlet valve and an electro-magnetically actuated exhaust valve for each end of the cylinder, an electric circuit for said valves, means operated by said piston for switching the current to alternate inlet and exhaust valves to effect operation of said piston while the energizing current is on, an "on" and "off" switch, and means operatively connected with said "on" and "off" switch for effecting a stoppage of said shaft in a predetermined position as the current that effects the alternate energization of the magnets is discontinued.

4. A motor comprising a casing including a cylinder having end heads, a duplex piston operating in said cylinder, a shaft mounted in said cylinder and geared to said piston for operation by the same, said casing having two sets of inlet and outlet valve chambers, inlet and outlet valves in said chambers, inflatable bags in the cylinder against the outer ends of said duplex piston, means to deliver compressed air to said inlet valves and exhaust air from said outlet valves, means to deliver the air from said inlet valves into said inflatable bags and to conduct the air from said inflatable bags to the exhaust valves, electrically energized means for alternately operating said inlet and exhaust valves in timed relation to the piston to effect continuous operation of said piston in said cylinder, said electrically energized means including an electric circuit, a mechanically actuated circuit commutating switch, an "on" and "off" switch operatively connected with said electrically energized means, and including means for effecting a return of said piston to a predetermined position to park the shaft.

5. A motor comprising a casing including a cylinder having end heads, a duplex piston operating in said cylinder, a shaft mounted in said cylinder and geared to said piston for operation by the same, said casing having two sets of inlet and outlet valve chambers, inlet and outlet valves in said chambers, inflatable bags in the cylinder against the outer ends of said duplex piston, means to deliver compressed air to said inlet valves and exhaust air from said outlet valves, means to deliver the air from said inlet valves into said inflatable bags and to conduct the air from said inflatable bags to the exhaust valves, electrically energized means for alternately operating said inlet and exhaust valves in timed relation to the piston to effect continuous operation of said piston in said cylinder, said electrically energized means including an electric circuit, a mechanically actuated circuit commutating switch, an "on" and "off" switch operatively connected with said electrically energized means, and including means for effecting a return of said piston to a predetermined position as the current is being turned off to stop the motor and park the shaft in a predetermined position.

6. A casing having a cylinder bore through the same, a duplex piston in said bore, removable heads for said casing, inflatable air bags in said cylinder, means holding said bags to said heads to engage respectively the ends of said piston, said piston having a rack portion, a shaft journalled in bearings in said casing and having a pinion to mesh with said rack portion, said casing having an intake-valve-bore and an exhaust-valve-bore, means effecting communication between said inlet-valve-bore and said inflatable bags, means admitting fluid under pressure to said casing inlet-valve-bore, electro-magnetically actuated inlet valves in said inlet-valve-bore for controlling the flow of live fluid to said bags, means effecting communication between said inflatable bags and said exhaust-valve-bore, means to pass exhaust fluid from said exhaust-valve-bore to atmosphere, electro-magnetically actuated exhaust valves in said exhaust-valve-bore for controlling the outflow of exhausted fluid from said bags to atmosphere, and means for energizing said valves in timed relation alternately to inflate and deflate said bags.

7. A casing having a cylinder bore through the same, a duplex piston in said bore, removable heads for said casing, inflatable air bags in said cylinder, means holding said bags to said heads to engage respectively the ends of said piston, said piston having a rack portion, a shaft journalled in bearings in said casing and having a pinion to mesh with said rack portion, said casing having an intake-valve-bore and an exhaust-valve-bore, means effecting communication between said inlet-valve-bore and said inflatable bags, means admitting fluid under pressure to said casing inlet-valve-bore, electro-magnetically actuated inlet valves in said inlet-valve-bore for controlling the flow of live fluid to said bags, means effecting communication between said inflatable bags and said exhaust-valve-bore, means to pass exhaust fluid from said exhaust-valve-bore to atmosphere, electro-magnetically actuated exhaust valves in said exhaust-valve-bore for controlling the outflow of exhausted fluid from said bags to atmosphere, means for energizing said valves in timed relation alternately to inflate and deflate said bags, said last named means comprising electric circuits including the magnets of said electro-magnetically actuated valves, a commutating switch actuated by the movement of said shaft for alternately effecting energization of inlet valves and cooperating exhaust valves, and means for parking said shaft in a predetermined position when current is cut off from said commutating switch.

8. A casing having a cylinder bore through the same, a duplex piston in said bore, removable heads for said casing, inflatable air bags in said cylinder, means holding said bags to said heads to engage respectively the ends of said piston, said piston having a rack portion, a shaft journalled in bearings in said casing and having a pinion to mesh with said rack portion, said casing having an intake-valve-bore and an exhaust-valve-bore, means effecting communication between said inlet-valve-bore and said inflatable bags, means admitting fluid under pressure to said casing inlet-valve-bore, electro-magnetically actuated inlet valves in said inlet-valve-bore for controlling the flow of live fluid to said bags, means effecting communication between said inflatable bags and said exhaust-valve-bore, means to pass exhaust fluid from said exhaust-valve-bore to atmosphere, electro-magnetically actuated exhaust valves in said exhaust-valve-bore for controlling the outflow of exhausted fluid from said bags to atmosphere, means for energizing said valves in timed relation alternately to inflate and deflate said bags, said last named means comprising electric circuits including the magnets of said electro-magnetically actuated valves, a commutating switch for alternately effecting energization of inlet valves and cooperating exhaust valves, and means for parking the shaft in a predetermined position when current is cut off from the commutating switch.

9. A casing having a cylinder bore through the same, a duplex piston in said bore, removable heads for said casing, inflatable air bags in said cylinder, means holding said bags to said heads to engage respectively the ends of said piston, said piston having a rack portion, a shaft journalled in bearings in said casing and having a pinion to mesh with said rack portion, said casing having an intake-valve-bore and an exhaust-valve-bore, means effecting communication between said inlet-valve-bore and said inflatable bags, means admitting fluid under pressure to said casing inlet-valve-bore, electro-magnetically actuated inlet valves in said inlet-valve-bore for controlling the flow of live fluid to said bags, means effecting communication between said inflatable bags and said exhaust-valve-bore, means to pass exhaust fluid from said exhaust-valve-bore to atmosphere, electro-magnetically actuated exhaust valves in said exhaust-valve-bore for controlling the outflow of exhausted fluid from said bags to atmosphere, means for energizing said valves in timed relation alternately to inflate and deflate said bags, said last named means comprising electric circuits including the magnets of said electro-magnetically actuated valves, a commutating switch for alternately effecting energization of inlet valves and cooperating exhaust valves, and means for parking the shaft in a predetermined position when current is cut off, said parking means comprising a cut-off switch having means operative during its movement from its "on" to its "off" position to effect energization of one inlet valve and its cooperating exhaust valve for purposes described.

10. A casing enclosing a piston chamber and two valve chambers, means to effect communication between the ends of said valve chambers and the corresponding ends of said piston chamber, a piston in said piston chamber, comprising two spaced heads connected by a rack bar, a wiper shaft mounted in bearings in said casing and having a pinion to engage said rack bar, a pair of inlet valves in one of said valve chambers and a pair of exhaust valves in the other of said valve chambers for controlling the air admission to and exhaustion from the respective ends of said piston chamber, means to deliver working fluid to said inlet valves, means to conduct exhausted fluid from said exhaust valves to atmosphere, electro-magnetic means for actuating said valves to operate the same in timed relation, and means for rendering said valve-actuating means active or inactive at will and effecting a stoppage of said piston in a predetermined place when desired.

11. A casing enclosing a piston chamber and two valve chambers, means to effect communication between the ends of said valve chambers and the corresponding ends of said piston chamber, a piston in said piston chamber, comprising two spaced heads connected by a rack bar, a shaft mounted in bearings in said casing and having a pinion to engage said rack bar, pair of inlet valves in one of said valve chambers and a pair of exhaust valves in the other of said valve chambers for controlling the air admission to and exhaustion from the respective ends of said piston chamber, means to deliver working fluid to said inlet valves, means to conduct exhausted fluid from said exhaust valves to atmosphere, means for actuating said valves to operate the same in timed relation, and means for rendering said valve-actuating means active or inactive at will and effecting a stoppage of said piston in a predetermined place when desired, said valve-actuating means comprising solenoidal magnets whose cores constitute the valves proper.

12. In a windshield wiper motor, a casing, a valve-controlled piston in said casing, an inlet valve unit in said casing and comprising a cylinder, a mid-partition in said cylinder, magnet bases adjacent said partition, solenoidal-magnet coils held in said bases, combined air-valve-cores operating in said coils and each having valve elements and fixedly located valve seats with which said elements cooperate, means to pass working fluid through said combined air-valve-cores and through said fixedly located seats to actuate said piston, and means to exhaust spent fluid to atmosphere.

13. In a windshield wiper motor, a casing, a valve-controlled piston in said casing, an inlet valve unit in said casing and comprising a cylinder, a mid-partition in said cylinder, magnet bases adjacent said partition, solenoidal-magnet coils held in said bases, combined air-valve-cores operating in said coils and each having valve elements and fixedly located valve seats with which said elements cooperate, means to pass working fluid through said combined air-valve-cores and through said fixedly located seats to actuate said piston, an exhaust valve unit in said casing and comprising a cylinder containing magnet bases with valve seat ports for spent fluid, solenoidal-magnet coils held in the cylinder on said bases, combined exhaust-valve-cores operating in their respective coils and each having valve elements to cooperate with the corresponding valve seat ports, said combined exhaust-valve-cores having fluid passages communicating with atmosphere.

14. In a windshield wiper motor, a casing, a valve-controlled piston in said casing, an inlet valve unit in said casing and comprising a cylinder, a mid-partition in said cylinder, magnet bases adjacent said partition, solenoidal-magnet coils held in said bases, combined air-valve-cores operating in said coils and each having valve elements and fixedly located valve seats with which said elements cooperate, means to pass working fluid through said combined air-valve-cores and through said fixedly located seats to actuate said piston, means to exhaust spent fluid to atmosphere, and means for energizing and de-energizing said valves in timed relation to operate as required.

15. In a windshield wiper motor, a casing, a valve-controlled piston in said casing, an inlet valve unit in said casing and comprising a cylinder, a mid-partition in said cylinder, magnet bases adjacent said partition, solenoidal-magnet coils held in said bases, combined air-valve-cores operating in said coils and each having valve elements and fixedly located valve seats with which said elements cooperate, means to pass working fluid through said combined air-valve-cores and through said fixedly located seats to actuate said piston, an exhaust valve unit in said casing and comprising a cylinder containing magnet bases with valve seat ports for spent fluid, solenoidal-magnet coils held in the cylinder on said bases, combined exhaust-valve-cores operating in their respective coils and each having valve elements to cooperate with the corresponding valve seat ports, said combined exhaust-valve-cores having fluid passages communicating with atmosphere, and means for energizing and de-energizing said valves in timed relation as required.

16. In a windshield wiper motor, a casing, a valve-controlled piston in said casing, an inlet valve unit in said casing and comprising a cylinder, a mid-partition in said cylinder, magnet bases adjacent said partition, solenoidal-magnet coils held in said bases, combined air-valve-cores operating in said coils and each having valve elements and fixedly located valve seats with which said elements cooperate, means to pass working fluid through said combined air-valve-cores and through said fixedly located seats to actuate said piston, means to exhaust spent fluid to atmosphere, and means for energizing and de-energizing said valves in timed relation to operate as required, said last named means comprising an automatically actuated commutating switch in electric circuits containing a source of energy, said magnets, and an "on" and "off" switch.

17. In a windshield wiper motor, a casing, a valve-controlled piston in said casing, an inlet valve unit in said casing and comprising a cylinder, a mid-partition in said cylinder, magnet bases adjacent said partition, solenoidal-magnet coils held in said bases, combined air-valve-cores operating in said coils and each having valve elements and fixedly located valve seats with which said elements cooperate, means to pass working fluid through said combined air-valve-cores and through said fixedly located seats to actuate said piston, means to exhaust spent fluid to atmosphere, and means for energizing and de-energizing said valves in timed relation to operate as required, said last named means comprising an automatically actuated commutating switch in electric circuits containing a source of energy, said magnets, and an "on" and "off" switch, said "on" and "off" switch including means for energizing one inlet valve magnet and its cooperative exhaust valve magnet as the current is being turned off by said "on" and "off" switch.

18. A compressed air actuated motor having a piston and electromagnetically actuated inlet and exhaust valves for effecting alternate back and forth travel of the piston; a current switching means for automatically effecting the magnet currents to cause continuous movement of the piston back and forth, in combination with means cooperatively connected with a source of electrical energy and with the magnets of said inlet and exhaust valves for effecting a starting and stopping of the motor and the parking of the piston in a predetermined position at will.

19. A compressed air actuated motor having a piston and electromagnetically actuated inlet and exhaust valves for effecting alternate back and forth travel of the piston; a current switching means for automatically effecting the magnet currents to cause continuous movement of the piston back and forth, in combination with means cooperatively connected with a source of electrical energy and with the magnets of said inlet and exhaust valves for effecting a starting and stopping of the motor and the parking of the piston in a predetermined position at will, said last named means including a manually operated "on" and "off" and "parking" switch.

GLEN F. DARLING.